United States Patent [19]

Thompson

[11] 4,416,462
[45] Nov. 22, 1983

[54] REMOVEABLE CUSHION FOR A SHOPPING CART

[76] Inventor: Judith D. Thompson, 723 Dresden Dr., Newport News, Va. 23601

[21] Appl. No.: 368,554

[22] Filed: Apr. 15, 1982

[51] Int. Cl.³ .......................... A47D 1/10; A47C 4/30; A47C 31/00
[52] U.S. Cl. ................................ 280/33.99 B; 5/448; 297/250
[58] Field of Search ................ 280/33.99 B; 297/250, 297/254; 5/448, 431

[56] References Cited

U.S. PATENT DOCUMENTS 3,578,380 5/1971 Jacobus .............................. 297/229
4,204,695 5/1980 Saltzman ...................... 280/33.99 B Primary Examiner—Alexander Grosz
Attorney, Agent, or Firm—Henderson & Sturm

[57] ABSTRACT

This invention relates to segmented support pads in general, and more specifically to a segmented cushioned support for use in a shopping cart. The device is constructed in such a manner; that it can either be attached to the handle of the shopping cart, to form a cushioned seat for an older child; or it can form a bed for a baby, having a cushioned head rest and sides.

10 Claims, 7 Drawing Figures

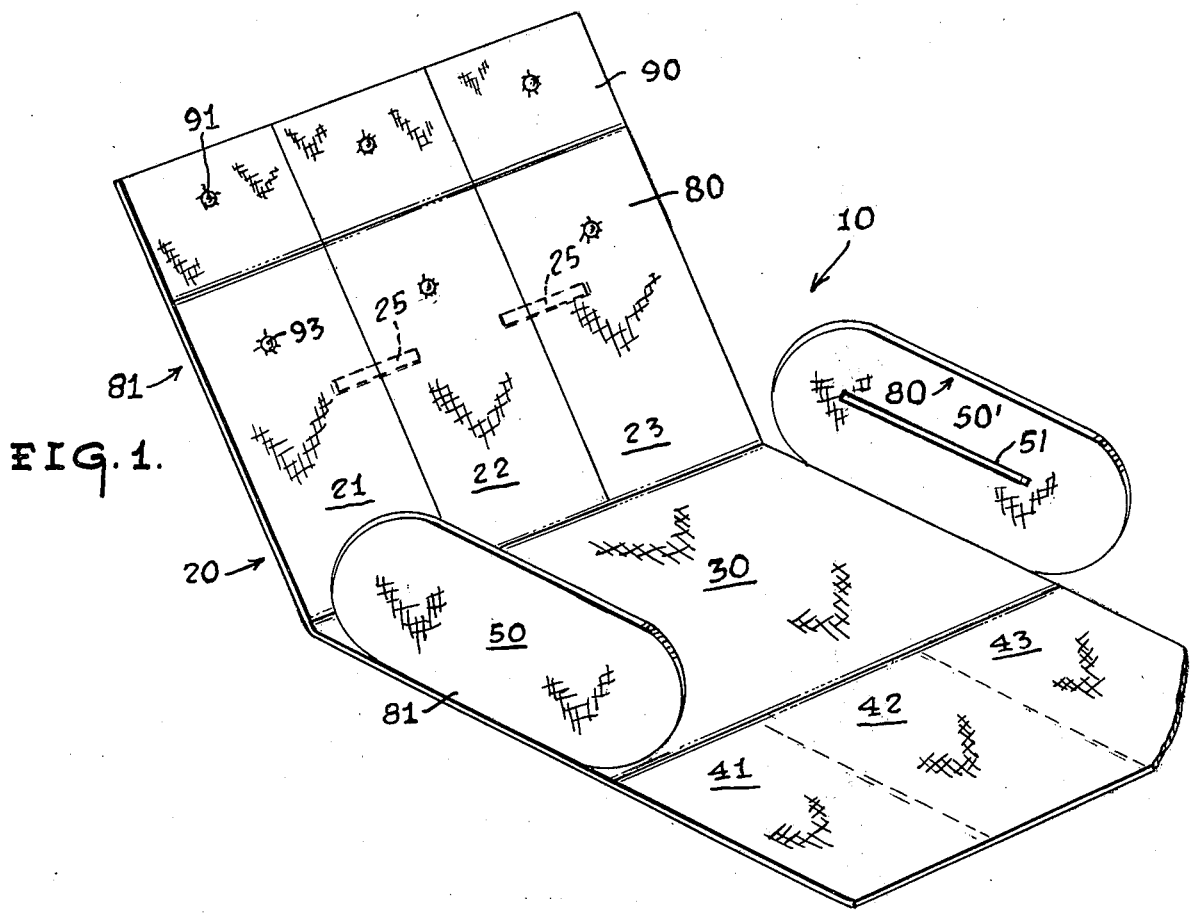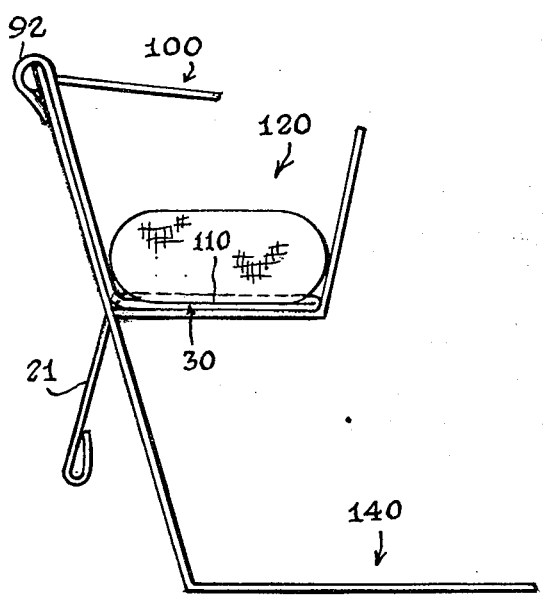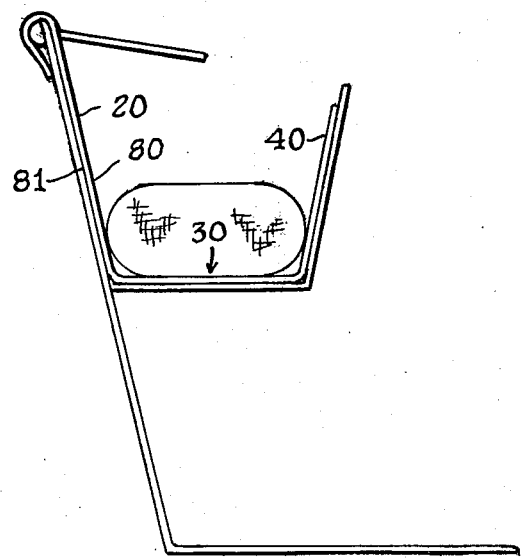

REMOVEABLE CUSHION FOR A SHOPPING CART

BACKGROUND OF THE INVENTION

Most parents are aware that the grocery shopping carts found in most stores, while usually providing a folding seat portion to accommodate a small child, generally provide an environment which is potentially dangerous for the child, in a worst case situation, and at the best an environment which is unsanitary and uncomfortable for the child. Some of the factors which contribute to this environment are the sharp edges and burrs found on the metal surfaces of the cart, the accumulated dirt, filth and contaminated substances deposited on the carts surfaces after prolonged use, and the fact that the metal surface will be cold to the touch in winter, and hot in summer.

For the foregoing reasons, while parents are forced to accept this environment out of necessity, they do so reluctantly, and with well founded concern for the health and well being of their children.

While the prior art is replete with padded cushion structures adapted for use with high-chairs and basinettes, examples of which can be seen by reference to U.S. Pat. Nos. 2,254,466; 2,237,057; 2,349,092 and 2,782,839, there has not been developed to date a removeable cushioned structure which is adapted and designed for use specifically in conjunction with a shopping cart. Furthermore, the only prior art device of which the Applicant is aware of, i.e. U.S. Pat. No. 3,578,380, which deals with the particular problems encountered with shopping carts, does not contain many of the features or functions embodied in the device, which forms the basis of the present invention.

It is safe to assume therefore, that there has been a long felt need, which has not been satisfied by the prior art devices, to provide a safe, sanitary, padded structure, which can be converted from a cushioned seat pad into a cushioned bed pad within the confines of a metal shopping cart.

SUMMARY OF THE INVENTION

An object of the present invention is the provision of an articulated cushioned pad device, which is specifically designed for use in a shopping cart.

Another object of the present invention is the provision of a removeable cushion for use in a shopping cart, either as a padded seat, or a padded enclosure, for an infant, or a small child.

Still another object of the present invention is the provision of a lightweight flexible padded structure, which is designed to not only provide cushioned support for a child placed in a shopping cart in the prone, or seated position, but also to provide a barrier between the child and the edges of the cart and the dirt, filth and germs normally associated with such structures.

A further object of the present invention is the provision of a soft flexible padded removeable cushion for shopping carts, which is machine washable after each use, to remove any contaminents picked up from the shopping carts interior during use.

Yet another object of the present invention is the provision of an extremely lightweight padded device, which is convenient to use, easy to carry to and from the point of use, and occupies very little space when not in use.

A yet further object of this invention is the provision of a sectional removeable cushion structure, which even though it is designed specifically for use in a shopping cart, can also be used in a vehicle on its way to and from the primary point of use, to protect childs skin from hot or cold vinyl car seats. These and other objects, advantages, and novel features of the invention will become apparent from the detailed description of the invention, when considered in conjunction with the accompanying drawings.

BRIEF DESCRIPTION DRAWINGS

FIG. 1, is a perspective view of the removeable cushion device, prior to being placed in a shopping cart.

FIG. 2, illustrates the device configured as a childs cushioned chair, in the seat portion of a shopping cart.

FIG. 3, illustrates the device configured as a generally rectangular cushioned enclosure for infants, in the seat portion of a shopping cart.

DETAILED DESCRIPTION OF THE PREFERRED EMBODIMENT

Figure 4:
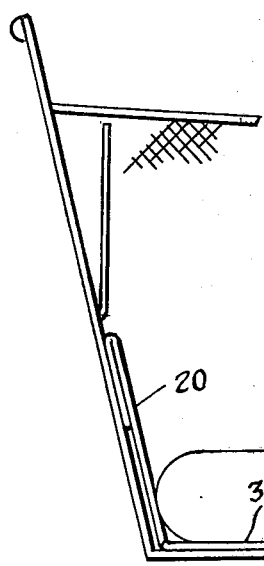
FIG. 4, illustrates the device configured to provide cushioned support for a child sitting in the bottom portion of the shopping cart.

The removeable cushion device for shopping carts, which forms the basis of the present invention, is designated generally as 10 in FIG. 1. The removeable cushion device 10, comprises an elongated rectangular cushioned segment 20, an intermediate rectangular cushioned segment 30, and a rectangular end cushioned segment 40. In addition, projecting from either side of the intermediate rectangular cushioned segment 30 are a pair of smaller, generally rectangular cushioned segments 50, 50'.

Each of the aforementioned cushioned segments 20, 30, 40, 50 and 50', is dimensioned, and designed, to cooperate with specific portions of the interior of a shopping cart 100, in both the folding seat area 120, and the main grocery receptacle area 140, respectively. The cushioned segments of the preferred embodiment 10, are formed by joining two sheets of material 80, 81 together, to create individual pockets or receptacles for cushioned pads, in a well recognized manner.

As each of the pockets is filled with the cushioned pads, the sheets of material 80, 81 are joined together to define the individual cushioned segment. In addition, each segment is spaced a sufficient distance from the adjoining segment, to provide a flexible hinge formed by the connection of the sheets of material.

The sheets of material, in addition to confining the cushioned pads, also extend beyond the free end of the first elongated rectangular cushioned segment 20, to form a flap member 90. The flap member 90, is further provided with fastening means 91, which cooperate with complementary fastening means 93, which extend through the rear face of the first elongated cushioned segment 20 to form a loop 92.

Given the fact that most modern shopping carts are provided with leg holes, so that a childs legs can extend beyond the seat portion 120 of the shopping cart in either the forward or rearward direction, this invention contemplates that the elongated rectangular segment 20 is formed from three independant portions 21, 22, and 23, which are releasably secured together by hook and loop type fastening means 25 disposed on the rearward face of the elongated rectangular segment 20. The reason for this particular construction is to allow the outermost portion 21 and 23 to extend through the leg holes in the back of the shopping cart to provide a padded surface for the back of a childs legs, which still providing a cushioned surface 22 for the childs groin area. In the older type shopping carts having the leg holes facing toward the front of the shopping cart, the end cushioned segment (in an alternate embodiment shown in FIG. 6) would likewise comprise three separate portions (in phantom) 41, 42, 43, which would be similarly releasably secured together.

Since the removeable cushion device 10, is intended specifically for use in a shopping cart, each of the cushioned segments is dimensioned to cooperate with specific portions of the shopping carts interior. For that reason, while the three major cushioned segments 20, 30, 40, all have the same width, their respective lengths will vary.

Figure 5:
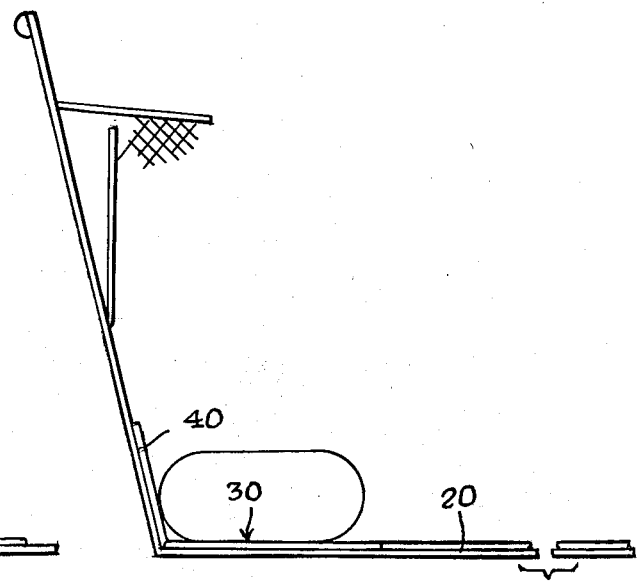
FIG. 5, illustrates the device configured to provide an infants cushioned bed, in the bottom portion of the shopping cart.

The elongated segment is, as its description suggests, longer than the intermediate and end segments. This is to insure the maximum cushioned surfact area for the childs upper torso and head, when the device is employed, in what are anticipated to be, the most commonly utilized configurations. These configurations are illustrated in FIGS. 2-7, and will be explained in greater detail further on in the specification. While the intermediate and end segments are approximately the same length, most shopping carts have a seat area whose depth is slightly greater than leg holes. For this reason the intermediate section in the preferred embodiment is slightly longer than the end section. Not only does this difference in length save on the material used in the construction of the device; but as can be seen in FIG. 5, this particular dimensioning produces a uniform height cushioned area surrounding the upper portion of a baby's torso, when the device is employed in the configuration illustrated.

The different lengths mentioned above, are designed to produce an articulated cushion device, that can assume various configurations within a shopping cart 100, by resting the respective segments against different portions of the shopping cart interior.

Given the fact that most nesting shopping carts share certain common features, such as a flat bottom, sloping sides, a raised handle portion at the rear of the cart, and a pivoted folding seat to accommodate an infant or a small child, it should therefore be readily apparent from FIGS. 2 thru 7, that the removeable cushioned device which forms the present invention, is configured specifically to take advantage of these structural similarities.

The most common anticipated usage of the removeable cushion for children over the age of 1 is illustrated in FIG. 2. In this particular configuration the intermediate, and end segments are folded with respect to each other, and rest on the seat portion of the shopping cart. The elongated segment rests against the upper portion, of the rear of the shopping cart, and extends upwardly to the level of the shopping cart handle bar. The flap member extends over the handle bar and is fastened to the rear of the elongated segment in a well recognized manner. The smaller generally rectangular segments 50 and 50' are supported by the sides of the shopping cart and form cushioned side segments. In addition, each of the side segments 50, 50' are further provided with slash pockets 51 for holding thin articles such as checkbook, credit cards, etc. This configuration shown in FIG. 2, therefore provides cushioned support for a small child in a sitting position from the back of the head to the buttocks, and on both sides, while also providing a means for retaining those small miscellaneous items that prove usefull during shopping trips.

The configuration shown in FIG. 3, is almost the same as that shown in FIG. 2; however, in this instance the end segment is not folded with respect to the intermediate section, but rests against the forward portion of the folding seat, to form an enclosure which is cushioned on four sides. This particular configuration is particularly suited for very small infants, which can be laid lengthwise across the width of the seat, which providing a much softer environment than a plastic infant carrier susceptable to tilting, slipping and sliding, which could easily allow the child to fall from the cart.

There are some children that are just not predisposed towards good behavior, when either seated in the upper portion of the shopping cart, or as their parents attempt to place their legs through the openings in the forward portion of the shopping cart seat. These children fall into two categories; the "grabbers", who can't resist grabbing everything within sight, as the shopping cart passes down the aisles; and the "kickers", who kick, struggle and generally resist their parents attempts to place their feet through the appropriate leg openings in the shopping cart seat. The configuration shown in FIG. 4, is particularly well suited to handle this situation, in that the elongated segment is placed flush against the rear portion of the shopping cart, with the intermediate and end segments lying flat on the bottom of the cart. With the cushioned device 10, thus disposed in the shopping cart 100, it can be seen that this configuration provides cushioned protection for a small child, in the sitting position, from the top of their head, to their feet, and on both sides.

The configuration shown in FIG. 5, is for use with infants that are too large to be laid lengthwise across the width of the shopping cart seat. In this instance, the end segment rests against the rear of the shopping cart, and the intermediate and elongated segments lie flat on the bottom of the shopping cart. The end segments in this configuration form the head rest portion, the intermediate and elongated segments form the bed portion, and as always the smaller segments form the side cushions.

Figure 6:
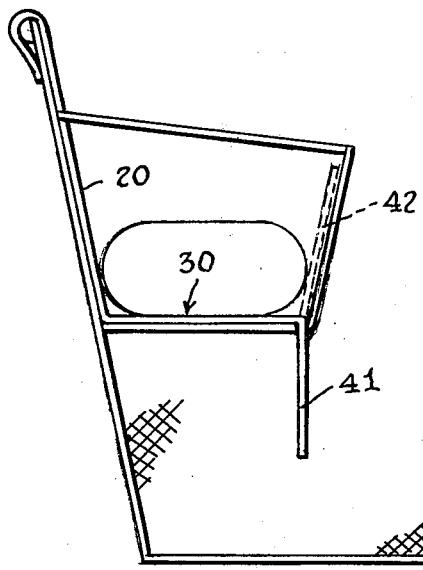
FIG. 6, illustrates an alternate for the seat configuration of FIG. 2, in an older style shopping cart.
Figure 7:
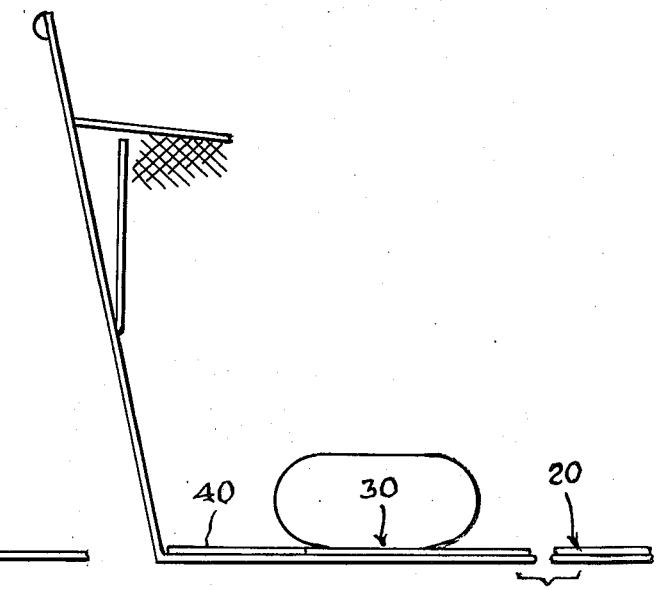
FIG. 7, illustrates the device configured to provide an infants cushioned bed without a head rest.

The configuration illustrated in FIG. 6, is only suitable for use with older shopping carts, which only provide a seat member and a single retaining bar forward of the child, but do not have individual leg holes. In this instance, the end segment is in its unfolded position, and hangs down from the forward end of the seat, to protect the back of the childs legs.

Returning to the specific components employed in the fabrication of this device, it should be appreciated that in the preferred embodiment, both sheets of material used to cover the cushioned segments are preferably formed of cloth material; however, it is also contemplated that while the top sheet of material will always be cloth, the bottom sheet may be an impervious material, such as plastic or rubber. The reason that the top sheet must be cloth, is that cloth breathes, does not retain heat or cold, and is softer to the touch against the childs skin. The reason that the bottom sheet may be an impervious material, is that the bottom sheet is in intimate contact with the dirt, grime and filth inside the shopping cart, and it will be this surface which requires cleaning after each use. Therefore, by chosing rubber or plastic, the bottom surface can be wiped clean after each use, thereby prolonging the period of time between the machine washing of the entire device. This will not only prolong the useful like of the device, but it will also cut down on the cleaning costs associated therewith. Furthermore, if the bottom sheet is fabricated from rubber, the high coefficient of friction of this material will tend to restrict the sliding movement of the device within the shopping cart.

The cushioned pad, in the preferred embodiment comprises a thin layer of foam rubber, which has been cut into appropriately dimensioned sections, to be received between the sheet of material 80, 81, of each of the segments in a well recognized manner. Foam rubber was chosen due to its low cost, flexibility, and because it is machine washable; however, any other cushioned pad exhibiting the same characterictics or properties would be equally acceptable.

The cooperating fastening means 91 and 93 on the flap member 90 and the rear face of the elongated cushioned segment 20 respectively, are shown as a buckle and snap arrangement; however, any suitable fastening means would be acceptable. It should be noted at this point that the flap 90 forms an important part of this invention, in that it only provides a protective covering over the shopping cart handle to protect the child; but also prevents the soiling of the hands of the adult pushing the cart.

Having thereby disclosed the subject matter of this invention, it should be obvious that many substitutions, modifications and variations of the device are possible in light of the above teachings. It is therefore to be understood that the invention as taught and described is only to be limited by the breadth and scope of the appended claims.

What I claim:

1. In combination with a nesting shopping cart having a flat bottom, sloping sides, a raised handle portion at the rear of the cart, and a pivoted seat portion having leg holes adapted to receive a child's leg; a removable cushion device comprising;
   an elongated cushioned segment having a flap member projecting from its free end,
   an intermediate cushioned segment having smaller generally rectangular cushioned segments projecting from its sides,
   an end cushioned segment, and
   fastening means on said flap member and said elongated cushioned segment, which cooperate to releasably secure the removeable cushion device to, and provide a protective covering for the handle portion of the shopping cart.

2. A removeable cushion device for shopping carts as in claim 1; wherein,
   the elongated cushion segment and the intermediate cushion segment have the same width but different lengths.

3. A removeable cushion device for shopping carts as in claim 2; wherein,
   the elongated cushion segment and the end cushion segment have the same width but different lengths.

4. A removeable cushion device for shopping carts as in claim 1; wherein,
   the elongated, intermediate, and end cushion segments have the same width, but different lengths.

5. A removeable cushion device for shopping carts as in claim 1; wherein,
   each of the said cushion segments comprise a thin layer of foam rubber inserted between two sheets of material which are joined together.

6. A removeable cushion device for shopping carts as in claim 5; wherein,
   both sheets of material are cloth.

7. A removeable cushion device for shopping carts as in claim 5; wherein,
   one of said sheets of material is cloth, and the other sheet is an impervious material.

8. A removeable cushion device for shopping carts as in claim 5; wherein,
   the flap member is formed for an extension of said sheets of material.

9. A removeable cushion device for shopping carts as in claim 1; wherein,
   at least one of the smaller generally rectangular cushioned segments, which project from the side of the intermediate cushioned segment, is provided with a pocket dimensioned to receive small items.

10. A removeable cushion device for shopping carts as in claim 1; wherein,
    the elongated cushioned segment is comprised of three separate portions, which are releasably connected together.

* * * * *